US007822842B2

(12) United States Patent
Jung et al.

(10) Patent No.: US 7,822,842 B2
(45) Date of Patent: Oct. 26, 2010

(54) SYSTEM OF MANAGING CONNECTION TO WEB SERVICES AND METHOD THEREOF

(75) Inventors: Han Min Jung, Daejeon-si (KR); Mi Kyung Lee, Gyeongsan-si (KR); Pyung Kim, Daejeon-si (KR); Seung Woo Lee, Daejeon-si (KR); Du Seok Jin, Daejeon-si (KR); Jung Sun Yoon, Daejeon-si (KR); Dong In Park, Seoul (KR); Won Kyung Sung, Daejeon-si (KR); Sun Hwa Hahn, Daejeon-si (KR)

(73) Assignee: Korea Institute of Science and Technology Information, Daejeon (KR)

( * ) Notice: Subject to any disclaimer, the term of this patent is extended or adjusted under 35 U.S.C. 154(b) by 180 days.

(21) Appl. No.: 12/185,218

(22) Filed: Aug. 4, 2008

(65) Prior Publication Data

US 2009/0254644 A1    Oct. 8, 2009

(30) Foreign Application Priority Data

Apr. 7, 2008    (KR) ...................... 10-2008-0032329

(51) Int. Cl.
*G06F 15/16* (2006.01)
*G06F 15/173* (2006.01)

(52) U.S. Cl. ....................... 709/223; 709/227; 709/245; 709/231; 709/219; 719/316; 719/313; 717/114; 717/147; 717/100

(58) Field of Classification Search ................. 709/223, 709/227, 203, 231, 245, 219, 202
See application file for complete search history.

(56) References Cited

U.S. PATENT DOCUMENTS

2006/0143160 A1*  6/2006  Vayssiere ........................ 707/3
2007/0230374 A1* 10/2007  Altberg et al. ............... 370/271
2008/0071642 A1*  3/2008  Leiba ........................... 705/27

* cited by examiner

*Primary Examiner*—Jude J Jean Gilles
(74) *Attorney, Agent, or Firm*—LRK Patent Law Firm

(57) ABSTRACT

The present invention relates to a system and method for managing connection between web services. The system includes an external web service connection setup server for determining an external web service to which connection is to be made, and establishing and verifying connection rules, and an external web service connection management server for conducting tests on connection to the external web service and storing the results of the tests. The system may further include a component for searching a connection target DB in which connection results are stored, and transmitting connection results to a main web service server, a component for removing a hyperlink to a failure page, and a component for sensing a sudden increase in a connection failure ratio. Accordingly, external web services belonging to all fields desired by a network manager can be easily, rapidly and efficiently connected.

24 Claims, 4 Drawing Sheets

Fig. 2

SYSTEM OF MANAGING CONNECTION TO WEB SERVICES AND METHOD THEREOF

BACKGROUND OF THE INVENTION

1. Field of the Invention

The present invention relates, in general, to a system and method for managing connections between web services. More particularly, the present invention relates to a system and method for managing connection between a main web service and an external web service through a wired/wireless network.

2. Description of the Related Art

A web robot is used to construct a mirroring site (having the same service hierarchy diagram, but having a different service IP address) or to set up connection to an external web service by collecting all or some of the web pages of an external web service site through a wired/wireless network. However, in the case where the external web service site does not permit the collection of web pages by a web robot (including the case where legal restrictions are imposed or where collection prohibition is announced), the use of a web robot is inevitably restricted. Most Internet portal sites currently prohibit the collection of web pages using web robots.

When it is desired to link only a specific part or page of an external web service site to a main web page, a hyperlink need only be added to the current main web page through a manual operation, but, when it is desired to link a considerable part or all of the external web service site to the main web page, there is a disadvantage in that a network manager must personally add all of the hyperlinks through a manual operation. Further, from the standpoint of a user, there is inconvenience in that, when the user desires to use various types of external web services, he or she must collect information while personally visiting required sites, and must waste a lot of time.

For example, in the case of a Digital Bibliography & Library Project (DBLP) site, in which foreign biographical information is mainly provided, the Uniform Resource Locator (URL) "http://www.informatik.uni-trier.de/~ley/db/indices/a-tree/j/Jung:Hanmin.html" is required in order to access a web page showing information about "Hanmin Jung". The last portion of the URL, that is, "j/Jung:Hanmin.html" is changed according to the names of persons, and the remaining portions are not changed. However, in addition to this rule, there are several rules for the names of persons.

For example, in the case of "Jung Ho Ahn" in which respective components of a name are separated by a space, the name must be changed to "Ahn:Jung_Ho.html", in which the space between the components of the name is changed to the symbol "_". Further, in the case of "Jung-Hee Ahn", in which the components of a name are connected through "-", the symbol "-" present between the components of the name must be changed to "=", like "Ahn:Jung=Hee.html". Besides the above rules, since the user of the DBLP site does not know all URL rules for names, it is difficult in practice to 100% completely set up the connection between the main web service and the external web service.

Further, when an external web service is changed after the connection between the main web service and the external web service has been set up, the previously established rules do not apply any more, so that, when a user clicks a hyperlink, an error page is displayed. Furthermore, due thereto, the reliability and favorable impression of the user on the web page are deteriorated.

SUMMARY OF THE INVENTION

Accordingly, the present invention has been made keeping in mind the above problems occurring in the prior art, and an object of the present invention is to provide a system for managing connection between web services, which can easily, rapidly and efficiently connect to various types of external web services belonging to all fields desired by a network manager.

Another object of the present invention is to provide a system for managing connection between web services, which can minimize manual operation on the part of a network manager.

A further object of the present invention is to provide a system for managing connection between web services, which can greatly improve the precision of the connection between a main web service and an external web service.

Yet another object of the present invention is to provide a system for managing connection between web services, which can remarkably improve the convenience to a user who uses various types of external web services in a one-stop manner.

Still another object of the present invention is to provide a system for managing connection between web services, which can prevent web page display errors, thus increasing the reliability and creating the favorable impression of the user on the web page.

Still another object of the present invention is to provide a method of managing connection between web services, which can easily, rapidly and efficiently connect to various types of external web services belonging to all fields desired by a network manager.

Still another object of the present invention is to provide a method of managing connection between web services, which can minimize manual operation on the part of a network manager.

Still another object of the present invention is to provide a method of managing connection between web services, which can greatly improve the precision of the connection between a main web service and an external web service.

Still another object of the present invention is to provide a method of managing connection between web services, which can remarkably improve the convenience to a user who uses various types of external web services in a one-stop manner.

Still another object of the present invention is to provide a method of managing connection between web services, which can prevent web page display errors, thus increasing the reliability and creating the favorable impression of the user on the web page.

The above and other objects can be achieved by the present invention, which will be described in detail.

In order to accomplish the above objects, the present invention provides a system for managing connection between web services, the system being connected through a wired/wireless communication network and configured to perform computer communication and operation processing, comprising an external web service connection setup server including a meta-information input unit for receiving external web service meta-information, a connection rule establishment unit for establishing external web service connection rules according to a regular expression syntax, a connection rule verification unit for verifying whether the established connection rules conform to a regular expression rule, and a connection rule storage unit for storing connection rules conforming to the regular expression syntax; and an external web service connection management server including a connection test unit for generating a Uniform Resource Locator (URL) by searching the stored connection rules for an applicable rule corresponding to each connection target stored in a connection target database and by applying the applicable rule to the connection target, and then accessing the URL and acquiring a returned page, and a connection result storage unit for storing connection results, indicating whether the returned page is a success page or a failure page, in the connection target DB.

Preferably, the external web service connection management server may further comprise a connection result search unit for searching the connection target DB for connection results corresponding to a connection target and transmitting found connection results to a main web service server when an information transmission request for the connection target is received from the main web service server. Preferably, the system may further comprise the main web service server including a hyperlink control unit for removing a hyperlink to a URL corresponding to a failure page. Preferably, the external web service connection setup server may further comprises a connection rule re-establishment requesting unit for outputting a user interface, which requests re-establishment of connection rules when the established external web service connection rules do not conform to a regular expression syntax. Preferably, the external web service connection management server may further comprise a connection failure ratio determination unit for outputting a user interface, which provides notification that a rate of increase in a ratio of failure pages to total returned pages acquired by the connection test unit exceeds a preset rate of increase when the rate of increase in the ratio exceeds the preset rate of increase. Preferably, the system may further include a connection result presentation unit for outputting a user interface, which indicates whether the returned page is a success page or a failure page, in a form of statistics or a list.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a diagram showing an example of a page displayed when a link to an external web service page succeeds according to an embodiment of the present invention;

DESCRIPTION OF THE PREFERRED EMBODIMENTS

Figure 1:
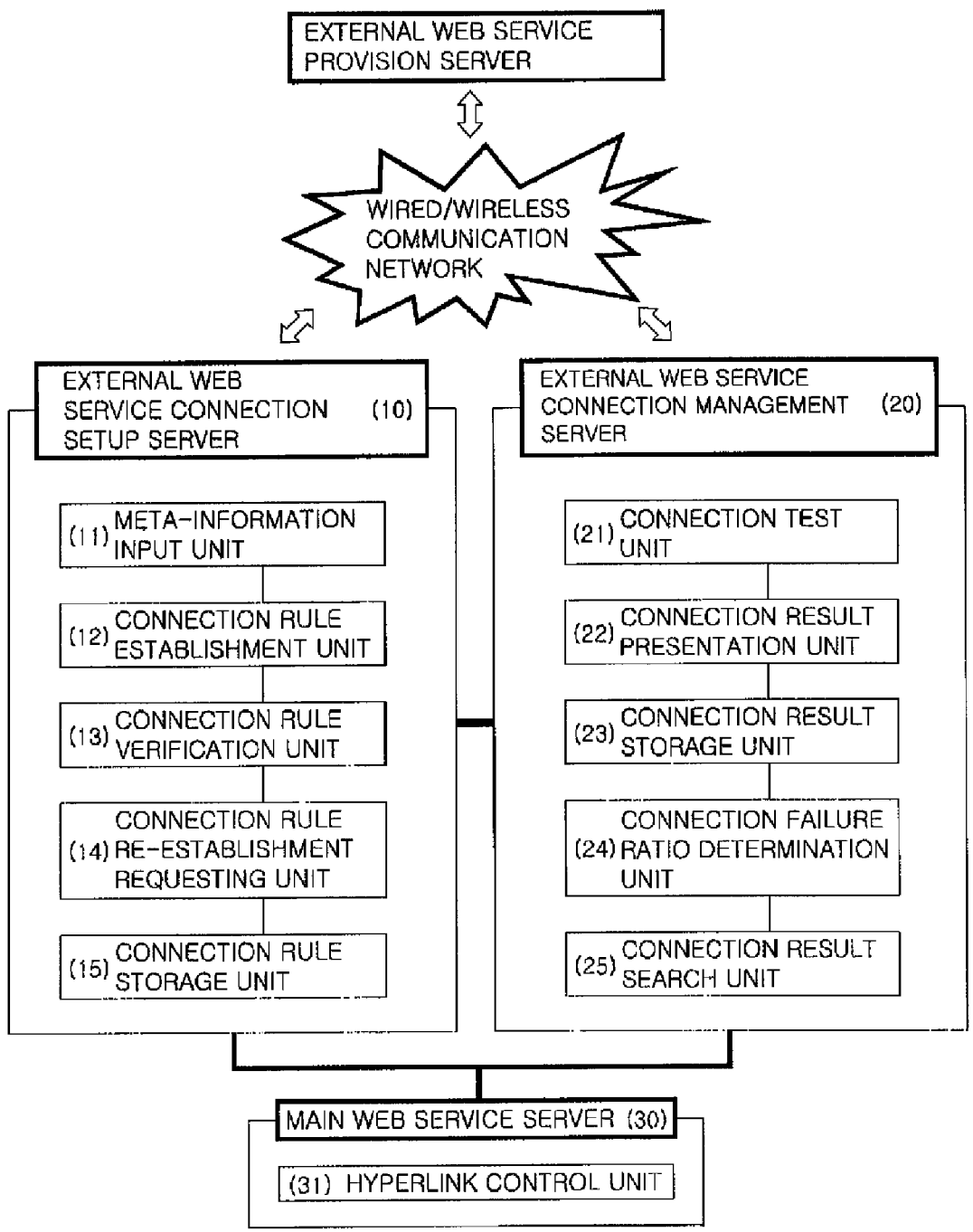
FIG. 1 is a diagram showing the construction of a system for managing connection between web services according to an embodiment of the present invention.

Hereinafter, embodiments of the present invention will be described in detail with reference to the attached drawings.

A wired/wireless communication network connection method and a computer communication and operation processing method are well-known technology, and can be easily implemented by those skilled in the art. A system according to the present invention is characterized in that it includes a server for setting up and managing connection to an external web service while connecting to a wired/wireless communication network. In this case, the external web service of the present invention is different from a main web service, and a main web service server is operated by the side for managing both an external web service connection setup server and an external web service connection management server, but an external web service server is not operated by that side. For example, the main web service may be a service provided on the site of Korea Institute of Science and Technology Information (Kisti), and Kisti may manage a main web service server, an external web service connection setup server, and an external web service connection management server. Meanwhile, the external web service is a foreign biographical information service provided by a DBLP site, and Kisti cannot directly manage the DBLP site. Furthermore, the external web service of the present invention may include services for providing biographical information, thesis information, etc., but is not particularly limited to these services, and may include all types of service provided through the web.

A server according to the present invention is a computer, which performs communication through a network and computer operation processing. Further, the server according to the present invention includes components for performing various functions, each component being operated by the processor, memory, an input/output means, etc. of the server. The method itself, in which the components of the server according to the present invention are operated by the processor, memory or input/output means of the server, is well-known technology, and can be easily implemented by those skilled in the art.

A system for managing connection between web services according to the present invention includes an external web service connection setup server 10 for determining the external web service to which connection is to be made, and establishing and verifying connection rules, and an external web service connection management server 20 for conducting tests on the external web service and storing the results of the tests.

The external web service connection setup server 10 of the present invention includes a meta-information input unit 11 for receiving external web service meta-information, a connection rule establishment unit 12 for describing external web service connection rules according to a regular expression syntax, a connection rule verification unit 13 for verifying whether the described external web service connection rules conform to a regular expression syntax, and a connection rule storage unit 15 for storing connection rules conforming to the regular expression syntax.

The meta-information input unit 11 receives external web service meta-information, and the meta-information includes various types of information, such as the URL of an external web service site, the description of an external web service, the features of the external web service, the latest update date of the external web service, and the features of the page displayed when connection succeeds or fails (in such a way as to include a specific keyword or to go to a specific URL).

The connection rule establishment unit 12 enables external web service connection rules to be described according to a Regular Expression (RE) syntax. Here, RE is intended to simply express character strings or the like in computer programming, and is well-known technology. For example, when a connection target is "Hanmin Jung", and the URL of an external web service page corresponding thereto is http://www.informatik.uni-trier.de/~ley/db/indices/a-tree/j/Jung:

Hanmin.html, the URL is divided into a fixed portion "http://www.informatik.uni-trier.de/~ley/db/indices/a-tree/" and a variable portion "j/Jung:Hanmin.html", and then there is a need to establish, for the variable portion, connection rules commanding that the locations of a family name and a first name be changed, spaces be changed to ":", and ".html" be attached when the variable portion satisfies the condition "[A-Z] [a-z]*[A-Z] [a-z]*". The conditional portion can be described according to an RE syntax, and the connection rules can be made through a simple character string program. A method itself of making connection rules through a character string program can be easily implemented by those skilled in the art.

The connection rule verification unit 13 verifies whether the established external web service connection rules are correct, using a simple regular expression parser, which is open to the general public as an open source, or the like. When verification (parsing) succeeds, the connection rule storage unit 15 stores relevant connection rules. When verification fails, the re-establishment of connection rules may be requested from a manager through a User Interface (UI). This request is performed by a connection rule re-establishment requesting unit 14.

The external web service connection management server 20 of the present invention includes a connection test unit 21 for generating a URL by searching the stored connection rules for an applicable rule corresponding to each connection target stored in a connection target Database (DB) and by applying the found connection rule to the connection target, and then accessing the URL and acquiring a returned page, and a connection result storage unit 23 for storing connection results, indicating whether the returned page is a success page or an failure page, in the connection target DB.

The connection test unit 21 acquires information about whether connection has succeeded by applying the stored external web service connection rules to the connection target DB either manually or periodically. The connection target DB may exist in the external web service connection management server 20, but is not particularly limited thereto. Further, when an external web service site is a site that provides biographical information, the connection target DB has biographical information, including the names of persons, in a field. For example, the place in which the name of a person such as "Hanmin Jung" is stored is the connection target DB and rules established to be suitable for the DBLP site are external web service connection rules. The connection test unit automatically generates a URL by searching the external web service connection rules for a connection rule, satisfying a condition, for each entry (the name of each person) stored in the connection target DB, and thereafter accesses the URL and acquires a returned page. That is, the connection rules stored in the connection rule storage unit 15 are searched through the connection rule establishment unit 12 and/or the connection rule verification unit 13 according to the present invention, so that a connection rule corresponding to a connection target is found and is applied to the connection target, and thus a URL is automatically generated. For example, when the connection target is "Bill Gates", the URL "http://www.informatik.uni-trier.de/~ley/db/indices/a-tree/j/Gates:Bill.html" is automatically generated by applying the connection rules to the connection target.

The connection result storage unit 23 stores connection results, indicating that a returned page is a success page or a failure page, in the connection target DB. For example, a column in which connection results are stored exists in the connection target DB, a value of "1" is stored when connection has succeeded for each connection target, and a value of "0" is stored when connection fails. That is, the connection result column of the connection target DB is constructed by the operation of the connection test unit and the connection result storage unit.

Figure 2:
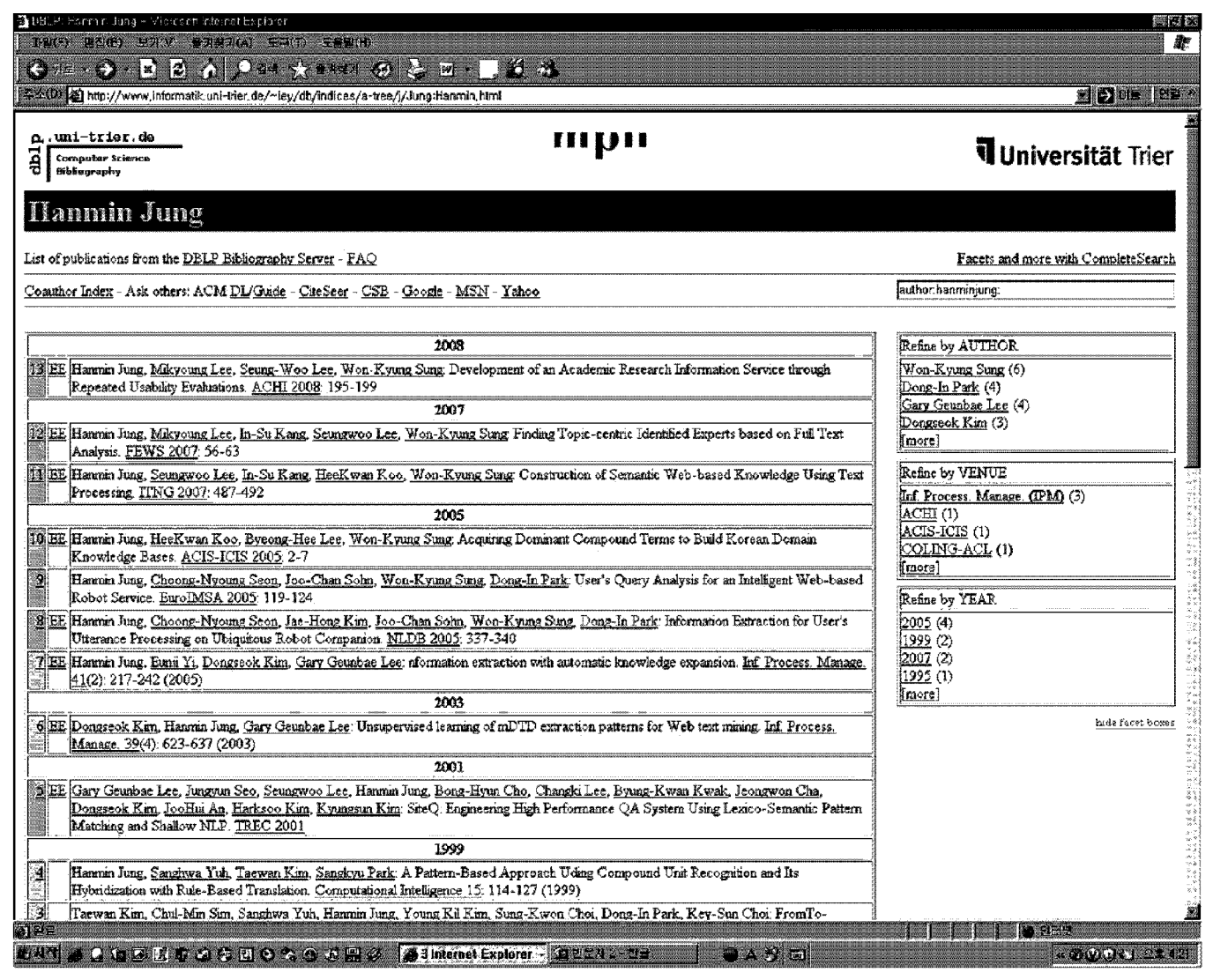

The external web service connection management server of the present invention may further include a connection result search unit for searching the connection target DB for connection results corresponding to a connection target and transmitting found connection results to the main web service server when an information transmission request for the connection target is received from the main web service server. For example, when an input value of "Hanmin Jung" is received at a search site provided by Kisti, the connection result search unit 25 automatically generates the URL "http://www.informatik.uni-trier.de/~ley/db/indices/a-tree/j/Jung:Hanmin.html", and transmits a value of "1" for "Hanmin Jung", which is stored in the connection result column of the connection target DB, to the server of the Kisti search site. Thereafter, the search site server may hyperlink to the URL in the web page showing search results (refer to FIG. 2).

Figure 3:
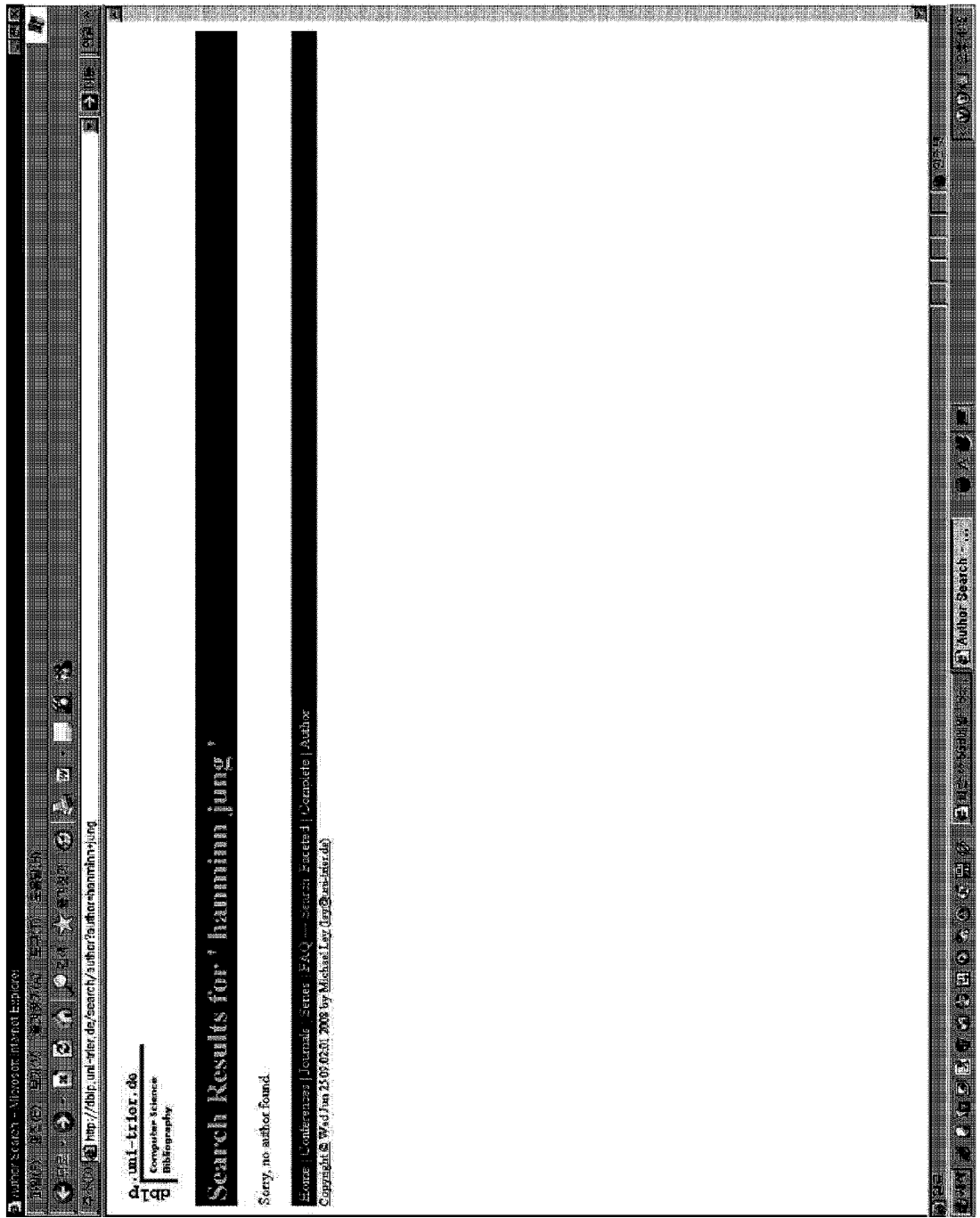
FIG. 3 is a diagram showing an example of a page displayed when a link to an external web service page fails according to an embodiment of the present invention.
Figure 4:
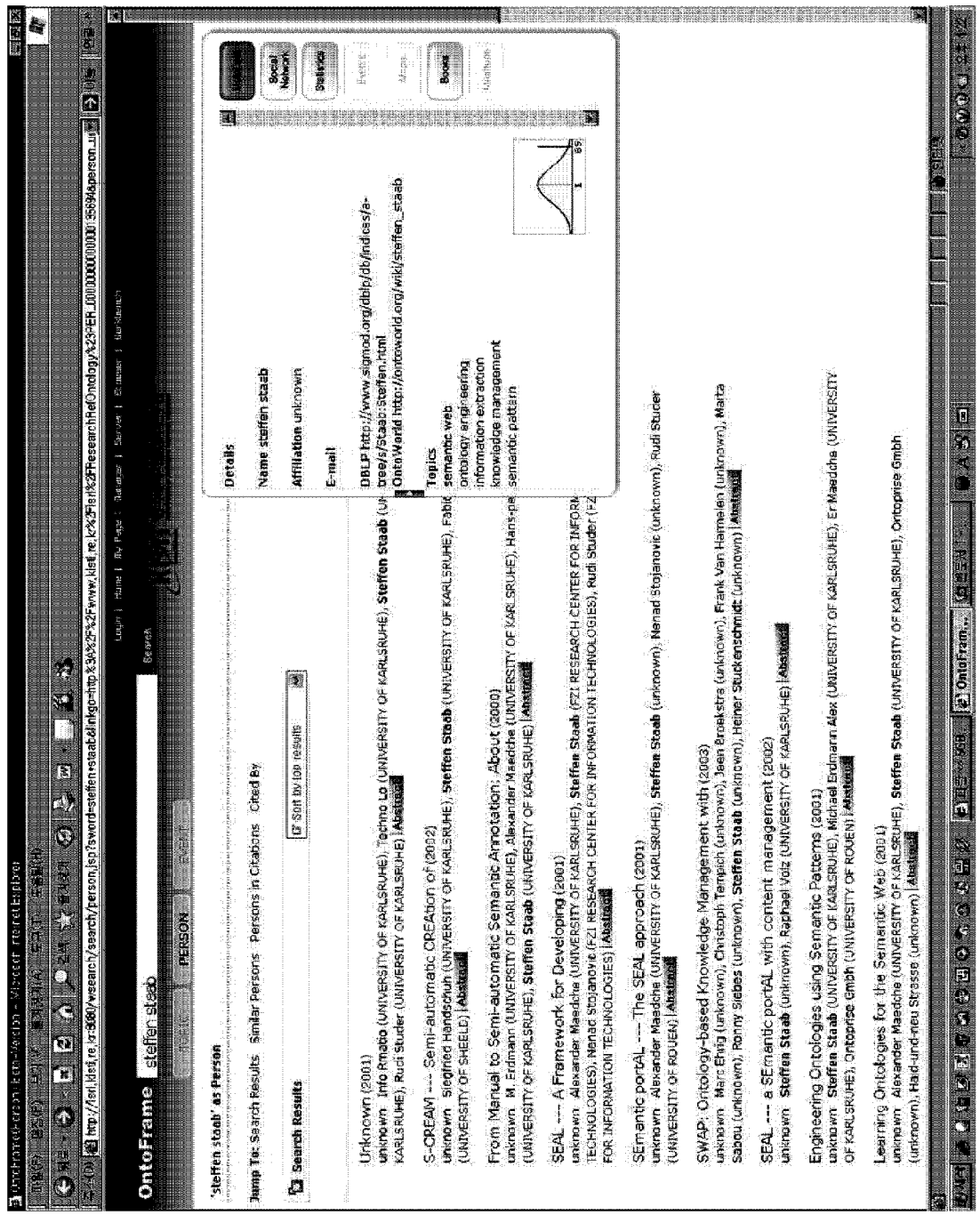
FIG. 4 is a diagram showing an example of a page displayed when a link to a page succeeds according to an embodiment of the present invention.

Meanwhile, the main web service server 30 may further include a hyperlink control unit 31 for removing a hyperlink to a URL corresponding to a connection target when results indicating that connection has failed are received through the connection result search unit. For example, when an input value of "Hanminn Jung" is received at a search site provided by Kisti, the connection result search unit 25 automatically generates the URL "http://www.informatik.uni-trier.de/~ley/db/indices/a-tree/j/Jung:Hanminn.html", and transmits a value of "0" for the input value of "Hanminn Jung", which is stored in the connection result column of the connection target DB, to the server of the Kisti search site. Thereafter, the search site server does not output the URL at the web page showing the search results (refer to FIG. 3).

The external web service connection management server may further include a connection result presentation unit 22. The connection result presentation unit 22 indicates success or failure through a UI by determining whether each returned page is a success page or a failure page. In this case, the UI may take the form of statistics, a list, etc. When the external web service connection rules are established, information about a success page or a failure page can be described. For example, when connection fails in the DBLP site, the phrase "Sorry, no author found" may be displayed in a returned page, or a page corresponding to the URL "http://www.informatik.uni-trier.de/ley/dbbin/author" may be returned. When connection succeeds, the phrase "List of publications from the DBLP Bibliography Server" can be displayed in the returned page.

The external web service connection management server may further include a connection failure ratio determination unit 24 for outputting a user interface, which provides notification that the rate of increase in the ratio of failure pages to total returned pages, acquired by the connection test unit, exceeds a preset rate of increase when the rate of increase in the ratio exceeds the preset rate of increase. The connection failure ratio determination unit senses the sudden increase in the ratio of failure pages to total returned pages and notifies the manager of the sudden increase by periodically presenting connection results and automatically calculating the connection failure ratio. Here, the setting of the rate of increase can be suitably implemented by those skilled in the art.

The method of managing connection between web services according to the present invention is characterized in that the method makes connection through a wired/wireless communication network and performs computer communication and operation processing, and in that the method includes the step of receiving external web service meta-information through the meta-information input unit, the step of describing external web service connection rules according to a regular expression syntax through the connection rule establishment unit, the step of verifying through the connection rule verification unit whether the established external web service connection rules conform to a regular expression syntax, the step of storing connection rules conforming to a regular expression syntax through the connection rule storage unit, the step of generating, through the connection test unit, a URL by searching the stored connection rules for an applicable rule corresponding to each connection target stored in the connection target DB and by applying the applicable connection rule to the connection target, and then accessing the URL and acquiring a returned page, and the step of storing connection results, indicating whether the returned page is a success page or a failure page, in the connection target DB through the connection result storage unit.

The method of the present invention may further include the step of searching the connection target DB for connection results corresponding to a connection target through the connection result search unit and transmitting found connection results to the main web service server when an information transmission request for the connection target is received from the main web service server.

The method of the present invention may further include the step of removing a hyperlink to a URL corresponding to a failure page through the hyperlink control unit of the main web service server.

The method of the present invention may further include the step of outputting, through the connection failure ratio determination unit, a user interface which provides notification that the rate of increase in the ratio of failure pages to total returned pages, acquired by the connection test unit, exceeds a preset rate of increase when the rate of increase in the ratio exceeds the preset rate of increase.

The method of the present invention may further include the step of outputting, through the connection rule re-establishment requesting unit, a user interface which requests the re-establishment of connection rules when the established external web service connection rules do not conform to a regular expression syntax.

The method of the present invention may further include the step of outputting, through the connection result presentation unit, a user interface, which indicates whether the returned page is a success page or a failure page, in the form of statistics or a list.

The method of the present invention can be performed according to the above description related to the system of the present invention.

The method of the present invention can be implemented in the form of computer-readable code in a computer-readable recording medium. The computer-readable recording medium is a recording device in which data readable by a computer system is stored. For example, recording media may include Read-Only Memory (ROM), Random Access Memory (RAM), cache memory, a hard disc, an optical disc, a floppy disc, magnetic tape, etc. Further, the recording media may also include a medium realized in the form of a carrier wave, and, for example, transmission performed over the Internet, may be implemented. Further, the computer-readable recording medium may be distributed to computer systems connected through a network and computer-readable code may be stored and executed in the computer systems in a distributed manner.

It should be noted that simple modifications or changes of the present invention can be easily implemented by those skilled in the art and are included in the scope of the present invention.

Accordingly, the present invention is advantageous in that it provides a system and method for managing connection between web services, which can easily, rapidly and efficiently connect to various types of external web services belonging to all fields desired by a network manager, can minimize manual operation on the part of the network manager, can greatly improve the precision of the connection between the main web service and the external web service, can remarkably improve the convenience to a user who uses various types of external web services in a one-stop manner, and can increase the reliability and create the favorable impression of the user on a web page by preventing web page display errors.

What is claimed is:

1. A system for managing connection between web services, the system being connected through a wired/wireless communication network and configured to perform computer communication and operation processing, comprising:
    an external web service connection setup server including a meta-information input unit for receiving external web service meta-information, a connection rule establishment unit for establishing external web service connection rules according to a regular expression syntax, a connection rule verification unit for verifying whether the established connection rules conform to a regular expression rule, and a connection rule storage unit for storing connection rules conforming to the regular expression syntax; and
    an external web service connection management server including a connection test unit for generating a Uniform Resource Locator (URL) by searching the stored connection rules for an applicable rule corresponding to each connection target stored in a connection target database and by applying the applicable rule to the connection target, and then accessing the URL and acquiring a returned page, and a connection result storage unit for storing connection results, indicating whether the returned page is a success page or a failure page, in the connection target DB.

2. The system according to claim 1, wherein the external web service connection management server further comprises a connection result search unit for searching the connection target DB for connection results corresponding to a connection target and transmitting found connection results to a main web service server when an information transmission request for the connection target is received from the main web service server.

3. The system according to claim 2, further comprising the main web service server including a hyperlink control unit for removing a hyperlink to a URL corresponding to a failure page.

4. The system according to claim 1, wherein the external web service connection management server further comprises a connection failure ratio determination unit for outputting a user interface, which provides notification that a rate of increase in a ratio of failure pages to total returned pages acquired by the connection test unit exceeds a preset rate of increase when the rate of increase in the ratio exceeds the preset rate of increase.

5. The system according to claim 1, wherein the external web service connection setup server further comprises a connection rule re-establishment requesting unit for outputting a user interface, which requests reestablishment of connection rules when the established external web service connection rules do not conform to a regular expression syntax.

6. The system according to claim 1, further comprising outputting a connection result presentation unit for outputting a user interface, which indicates whether the returned page is a success page or a failure page, in a form of statistics or a list.

7. The system according to claim 1, wherein the meta-information comprises a URL of an external web service site, description of the external web service, features of the external web service, a latest update date of the external web service, or features of an output page displayed when connection succeeds or fails.

8. The system according to claim 1, wherein the connection rule verification unit verifies the connection rules using a regular expression parser.

9. The system according to claim 1, wherein the connection test unit conducts connection tests either manually or periodically.

10. The system according to claim 1, wherein the external web service provides biographical information, thesis information, or combinations thereof.

11. A method of managing connection between web services, the method making a connection through a wired/wireless communication network and performing computer communication and operation processing, comprising the steps of:
receiving external web service meta-information through a meta-information input unit;
describing external web service connection rules according to a regular expression syntax through a connection rule establishment unit;
verifying through a connection rule verification unit whether the described external web service connection rules conform to a regular expression syntax;
storing connection rules conforming to the regular expression syntax through a connection rule storage unit;
generating, through a connection test unit, a Uniform Resource Locator (URL) by searching the stored connection rules for an applicable rule corresponding to each connection target, stored in a connection target database, and by applying the applicable rule to the connection target, and then accessing the URL and acquiring a returned page; and
storing connection results, indicating whether the returned page is a success page or a failure page, in the connection target database through a connection result storage unit.

12. The method according to claim 11, further comprising the step of searching the connection target database for connection results corresponding to a connection target through a connection result search unit and transmitting found connection results to a main web service server when an information transmission request for the connection target is received from the main web service server.

13. The method according to claim 12, further comprising the step of removing a hyperlink to a URL corresponding to a failure page through a hyperlink control unit of the main web service server.

14. The method according to claim 11, further comprising the step to of outputting, through a connection failure ratio determination unit, a user interface, which provides notification that a rate of increase in a ratio of failure pages to total returned pages acquired by the connection test unit exceeds a preset rate of increase when the rate of increase in the ratio exceeds the preset rate of increase.

15. The method according to claim 11, further comprising the step of outputting, through a connection rule re-establishment requesting unit, a user interface, which requests re-establishment of connection rules when the established external web service connection rules do not conform to a regular expression syntax.

16. The method according to claim 11, further comprising the step of outputting, through a connection result presentation unit, a user interface, which indicates whether the returned page is a success page or a failure page, in a form of statistics or a list.

17. The method according to claim 11, wherein the meta-information comprises a URL of an external web service site, description of the external web service, features of the external web service, service, or features a latest update date of the external web of an output page displayed when connection succeeds or fails.

18. The method according to claim 11, wherein the connection rule verification unit verifies the connection rules using a regular expression parser.

19. The method according to claim 11, wherein the connection test unit conducts connection tests either manually or periodically.

20. The method according to claim 11, wherein the external web service provides biographical information, thesis information, or combinations thereof.

21. A computer-readable recording medium for recording a program for executing the method according to claim 11 in a computer.

22. A computer-readable recording medium for recording a program for executing the method according to claim 14 in a computer.

23. A computer-readable recording medium for recording a program for executing the method according to claim 15 in a computer.

24. A computer-readable recording medium for recording a program for executing the method according to claim 16 in a computer.

* * * * *